US012669237B1

(12) United States Patent
He

(10) Patent No.: US 12,669,237 B1
(45) Date of Patent: Jun. 30, 2026

(54) COMBINED FAN AND LIGHT FIXTURE WITH QUICK-RELEASE STRUCTURE

(71) Applicant: GUANGDONG LAC SMART LIGHTING CO., LTD, Dongguan (CN)

(72) Inventor: Xiaoming He, Dongguan (CN)

(73) Assignee: GUANGDONG LAC SMART LIGHTING CO., LTD, Dongguan (CN)

( * ) Notice: Subject to any disclaimer, the term of this patent is extended or adjusted under 35 U.S.C. 154(b) by 0 days.

(21) Appl. No.: 19/361,213

(22) Filed: Oct. 17, 2025

(30) Foreign Application Priority Data

Sep. 25, 2025 (CN) ......................... 202522073889.2

(51) Int. Cl.

| | |
|---|---|
| ***F21V 21/03*** | (2006.01) |
| ***F04D 25/08*** | (2006.01) |
| ***F21S 8/04*** | (2006.01) |
| ***F21V 33/00*** | (2006.01) |

(52) U.S. Cl.

CPC ............ *F21V 21/03* (2013.01); *F04D 25/088* (2013.01); *F21S 8/043* (2013.01); *F21V 33/0096* (2013.01)

(58) Field of Classification Search

CPC ...... F21V 33/0096; F21V 17/18; F21S 8/043; F04D 25/088; F21C 21/03

See application file for complete search history.

(56) References Cited

U.S. PATENT DOCUMENTS

| | | | | |
|---|---|---|---|---|
| 11,815,256 | B1 * | 11/2023 | Wang | F21V 33/0096 |
| 2024/0318655 | A1 * | 9/2024 | Hattori | H02K 11/33 |

FOREIGN PATENT DOCUMENTS

| | | | | |
|---|---|---|---|---|
| CN | 110671659 A | * | 1/2020 | F21V 33/0096 |
| CN | 120176082 A | * | 6/2025 | F04D 29/002 |

OTHER PUBLICATIONS

Innovation Q+ NPL Search (Year: 2026).*

* cited by examiner

*Primary Examiner* — Anabel Ton

(74) *Attorney, Agent, or Firm* — HOWARD M COHN and Associates, LLC

(57) ABSTRACT

A combined fan and light fixture with quick-release structure is provided, in which retaining recesses each with an L-shaped configuration are defined on a mounting base, and latch protrusions and a latch mechanism matched with the retaining recesses are disposed at an annular connecting cover of a fan and light assembly. During installation, one only needs to align each of the latch protrusions with a corresponding recess opening, then lift and rotate each of the latch protrusions. Thereafter, a restoring force of an elastic member in the latch mechanism automatically drives a latch switch to move upward and abut against an end portion of one recess opening aligned therewith, thereby achieving rapid locking. This process is tool-free, simple, safe, and significantly improves efficiency of both installation and disassembly. Meanwhile, the latch mechanism effectively restricts relative rotation between the fan and light assembly and the mounting base, ensuring connection reliability.

10 Claims, 7 Drawing Sheets

COMBINED FAN AND LIGHT FIXTURE WITH QUICK-RELEASE STRUCTURE

TECHNICAL FIELD

The present disclosure relates to a field of fan and light fixtures, and in particular to a combined fan and light fixture with a quick-release structure.

BACKGROUND

Ceiling fan and light fixtures are household appliances that integrate lighting and fan functions and are typically mounted on room ceilings, providing illumination while promoting air circulation through rotating blades, thereby achieving combined effects of energy savings and comfort. As such, the ceiling fan and light fixtures have been widely adopted in residential and commercial settings.

A conventional ceiling fan and light fixture currently available in the market requires a two-step installation process. First, a mounting bracket is secured to a ceiling structure. Subsequently, a main body of the conventional ceiling fan and light fixture is directly secured to the mounting bracket using screws. Such installation method not only requires an installer to hold up the main body of the conventional ceiling fan and light fixture that is heavy for an extended period but also necessitates simultaneously aligning components and tightening the screws, which is not only labor-intensive and time-consuming but also creates significant safety hazards. Maintenance operations, such as cleaning, repair, or replacement, necessitate equally cumbersome procedures, requiring complete disassembly of all screws using tools before the conventional ceiling fan and light fixture can be removed. Consequently, current ceiling fan and light fixtures suffer from notable deficiencies in terms of installation and maintenance efficiency, involving excessive time, physical effort, and potential risks.

SUMMARY

Based on above, the present disclosure aims to provide a combined fan and light fixture with a quick-release structure.

Technical solutions adopted by the present disclosure are as follows.

The present disclosure provides a first embodiment of the combined fan and light fixture with the quick-release structure, including a mounting base, a fan and light assembly, and a latch mechanism. Retaining recesses are circumferentially spaced apart from each other on a bottom side wall of the mounting base, each of the retaining recesses defines a locking groove and a recess opening, each locking groove extends along a circumferential direction of the mounting base, and each recess opening is configured to communicate a corresponding locking groove with a bottom edge of the mounting base. The fan and light assembly includes a fan and light main body and an annular connecting cover, the annular connecting cover is fixed to a top portion of the fan and light main body, latch protrusions protrude from an inner side wall of the annular connecting cover, and the latch protrusions are configured to respectively match with the retaining recesses. The latch mechanism is disposed at the annular connecting cover, the latch mechanism includes a latch switch and an elastic member, the latch switch is slidably disposed at the annular connecting cover, the elastic member is disposed below the latch switch, a first end of the elastic member abuts against the latch switch, and a second end of the elastic member abuts against the fan and light assembly. When the fan and light assembly is assembled with the mounting base, the annular connecting cover is preliminarily sleeved on the mounting base, the latch switch is pressed downward by a bottom portion of the mounting base to slide along the annular connecting cover to further compress the elastic member; when the annular connecting cover rotates relative to the mounting base, each of the latch protrusions is moved to a position aligned with a corresponding recess opening and is vertically moved upward to enter a corresponding locking groove; when the annular connecting cover continues to rotate relative to the mounting base, each of the latch protrusions is driven to slide along the corresponding locking groove away from the corresponding recess opening, the latch switch is moved to align with a bottom portion of one recess opening and is pushed by a restoring force of the elastic member to embed into the one recess opening to lock the fan and light assembly against rotational movement relative to the mounting base.

The present disclosure provides a second embodiment of the combined fan and light fixture with the quick-release structure, including the mounting base, the fan and light assembly, and the latch mechanism. At least two retaining recesses are circumferentially spaced apart from each other on the bottom side wall of the mounting base, each of the at least two retaining recesses defines the locking groove and the recess opening, each locking groove extends along the circumferential direction of the mounting base, and each recess opening is configured to communicate the corresponding locking groove with the bottom edge of the mounting base. The fan and light assembly includes fan and light main body and the annular connecting cover, the annular connecting cover is fixed to the top portion of the fan and light main body, at least two latch protrusions protrude from the inner side wall of the annular connecting cover, and the at least two latch protrusions are configured to respectively match with the at least two retaining recesses. The annular connecting cover defines the sliding slot extending in a vertical direction, the sliding slot is defined circumferentially adjacent to one of the at least two latch protrusions, a bottom end of the sliding slot is communicated with a bottom portion of the annular connecting cover, and a top end of the sliding slot is disposed at a middle portion of the annular connecting cover. The latch mechanism is disposed at the annular connecting cover, the latch mechanism includes the elastic member and the latch switch, the latch switch is slidably disposed at the sliding slot of the annular connecting cover, the first end of the elastic member abuts against the latch switch, and the second end of the elastic member abuts against the fan and light assembly. When the fan and light assembly is assembled with the mounting base, the annular connecting cover is preliminarily sleeved on the mounting base, the latch switch is pressed downward by a bottom portion of the mounting base to slide along the sliding slot of the annular connecting cover to further compress the elastic member; when the annular connecting cover rotates relative to the mounting base, each of the latch protrusions is moved to the position aligned with the corresponding recess opening and is vertically moved upward to enter the corresponding locking groove; when the annular connecting cover continues to rotate relative to the mounting base, each of the latch protrusions is driven to slide along the corresponding locking groove away from the corresponding recess opening, the latch switch is moved to align with the bottom portion of one recess opening and is pushed by the restoring force of the elastic member to embed into the one recess opening to lock the fan and light assembly against rotational movement relative to the mounting base.

Beneficial effects of the present disclosure are as follows.

According to the combined fan and light fixture with the quick-release structure of the present disclosure, the retaining recesses each with an L-shaped configuration are defined on the mounting base, and the latch protrusions and the latch mechanism matched with the retaining recesses are disposed at the annular connecting cover of the fan and light assembly. During installation, one only needs to align each of the latch protrusions with the corresponding recess opening, then lift and rotate each of the latch protrusions. Thereafter, the restoring force of the elastic member in the latch mechanism automatically drives the latch switch to move upward and abut against an end portion of the one recess opening aligned therewith, thereby achieving rapid locking. This process is tool-free, simple, safe, and significantly improves efficiency of both installation and disassembly. Meanwhile, the latch mechanism effectively restricts relative rotation between the fan and light assembly and the mounting base, ensuring connection reliability. Furthermore, a bottom surface of each locking groove includes an abutting surface and a guiding surface, while a concave portion is disposed on each abutting surface, a protruding portion is disposed on a bottom portion of each of the latch protrusions to match with a corresponding concave portion. Such configuration offers smooth guidance during rotational engagement and achieves precise positional location upon completion, effectively preventing accidental loosening.

Figure 1:
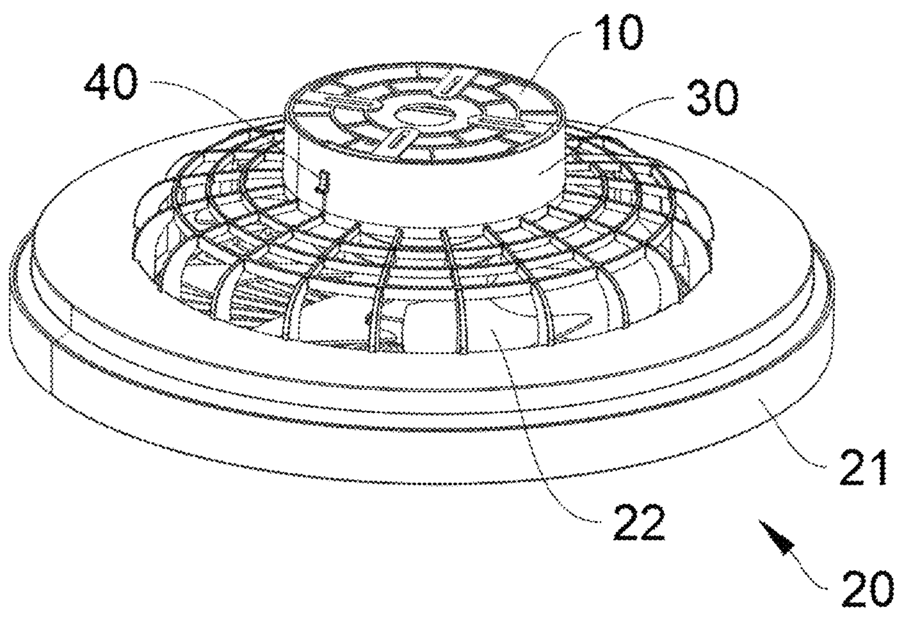
FIG. 1 is a structural schematic diagram of a combined fan and light fixture with quick-release structure of the present disclosure.
Figure 2:
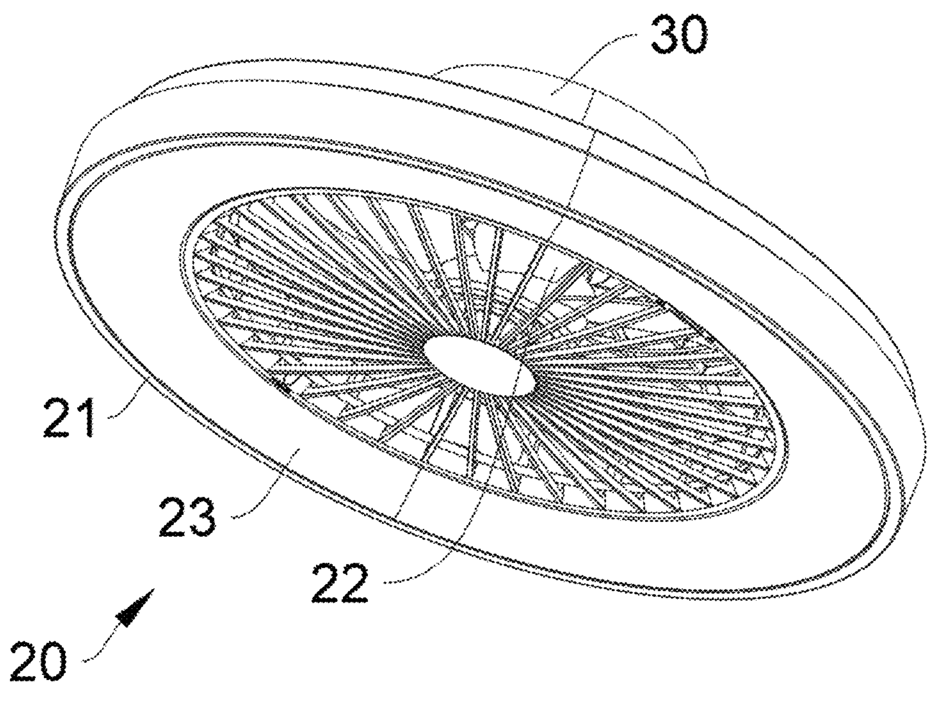
FIG. 2 is another structural schematic diagram of the combined fan and light fixture with quick-release structure shown in FIG. 1.
Figure 3:
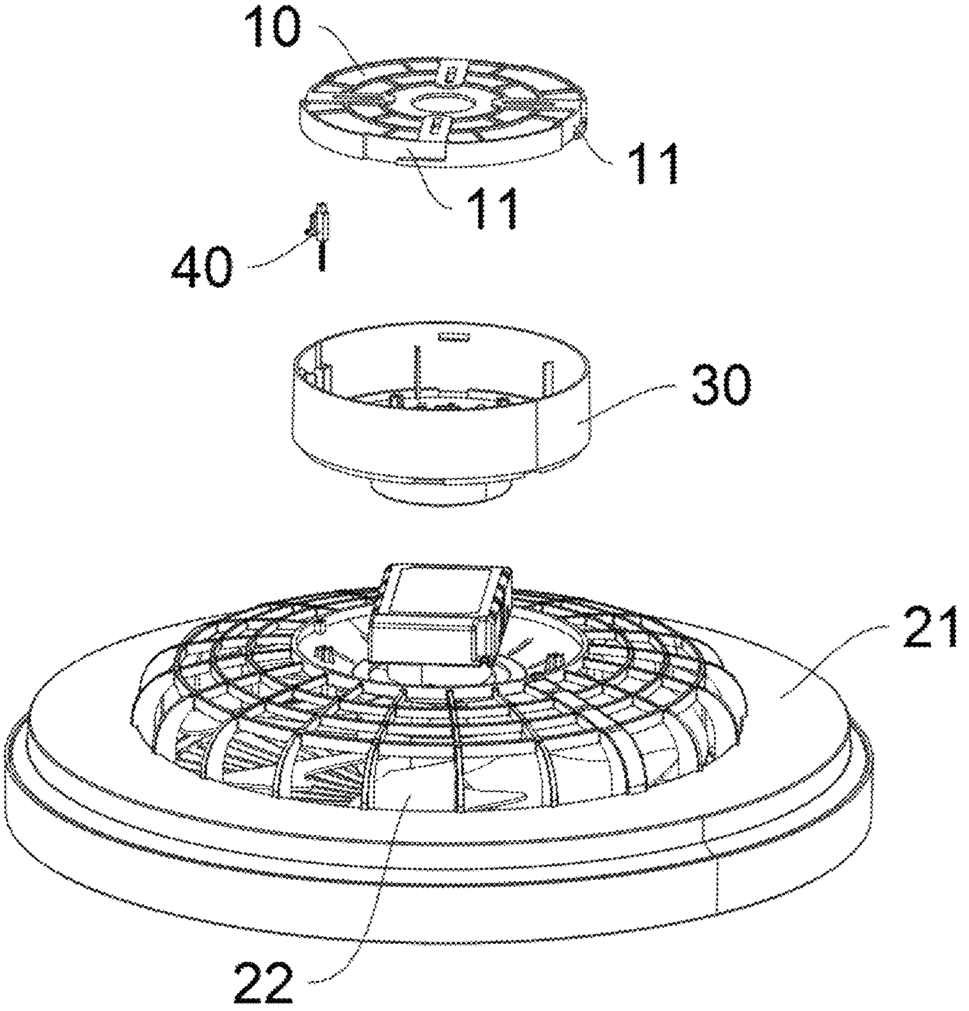
FIG. 3 is an exploded structural schematic diagram of the combined fan and light fixture with quick-release structure shown in FIG. 1.
Figure 4:
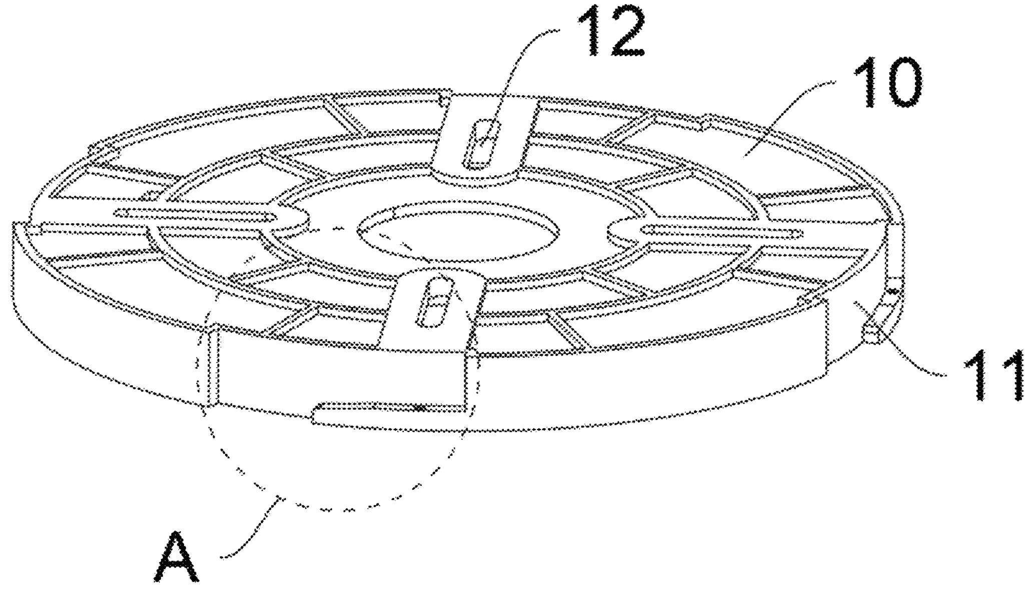
FIG. 4 is a structural schematic diagram of a mounting base shown in FIG. 3.

Reference numerals in the drawings: 10. mounting base; 11. retaining recess; 111. locking groove; 112. abutting surface; 113. concave portion; 114. guiding surface; 115. recess opening; 12. elongated mounting hole; 20. fan and light main body; 21. outer housing; 22. fan assembly; 23. lighting assembly; 30. annular connecting cover; 31. latch protrusion; 311. protruding portion; 32. guiding member; 33. guide rail; 34. sliding slot; 35. reinforcing rib; 40. latch mechanism; 41. latch switch; 411. sliding main body; 412. limiting portion; 413. extending portion; 414. press button; 415. press protrusion; 416. connecting post; 42. elastic member.

DETAILED DESCRIPTION OF EMBODIMENTS

Technical solutions in embodiments of the present disclosure are clearly and completely described below with reference to accompanying drawings in the embodiments of the present disclosure. Apparently, described embodiments are merely some rather than all of the embodiments of the present disclosure. All other embodiments obtained by those who skilled in the art based on the embodiments of the present disclosure without creative efforts shall fall within a protection scope of the present disclosure.

As shown in FIGS. 1-11C, the present disclosure provides a combined fan and light fixture with quick-release structure, including a mounting base 10, a fan and light assembly, and a latch mechanism 40. Retaining recesses 11 are circumferentially spaced apart from each other on a bottom side wall of the mounting base 10, each of the retaining recesses 11 defines a locking groove 111 and a recess opening 115, each locking groove 111 extends along a circumferential direction of the mounting base 10, each recess opening 115 extends along an axial direction of the mounting base 10, and each recess opening 115 is configured to communicate a corresponding locking groove 111 with a bottom edge of the mounting base 10. The fan and light assembly includes a fan and light main body 20 and an annular connecting cover 30, the annular connecting cover 30 is fixed to a top portion of the fan and light main body 20. Specifically, in the embodiment, the annular connecting cover 30 and the fan and light main body 20 are configured as separate structures. In other embodiments, the annular connecting cover 30 and the fan and light main body 20 are formed as an integral structure. Latch protrusions 31 protrude from an inner side wall of the annular connecting cover 30, and the latch protrusions 31 are configured to respectively match with the retaining recesses 11. The latch mechanism 40 is disposed at the annular connecting cover 30, the latch mechanism 40 includes a latch switch 41 and an elastic member 42, the latch switch 41 is slidably disposed at the annular connecting cover 30, the elastic member 42 is disposed below the latch switch 41, a first end of the elastic member 42 abuts against the latch switch 41, and a second end of the elastic member 42 abuts against the fan and light assembly. It is to be noted that, in other embodiment, a bottom end of the elastic member 42 is connected to the annular connecting cover 30.

Figure 11A:
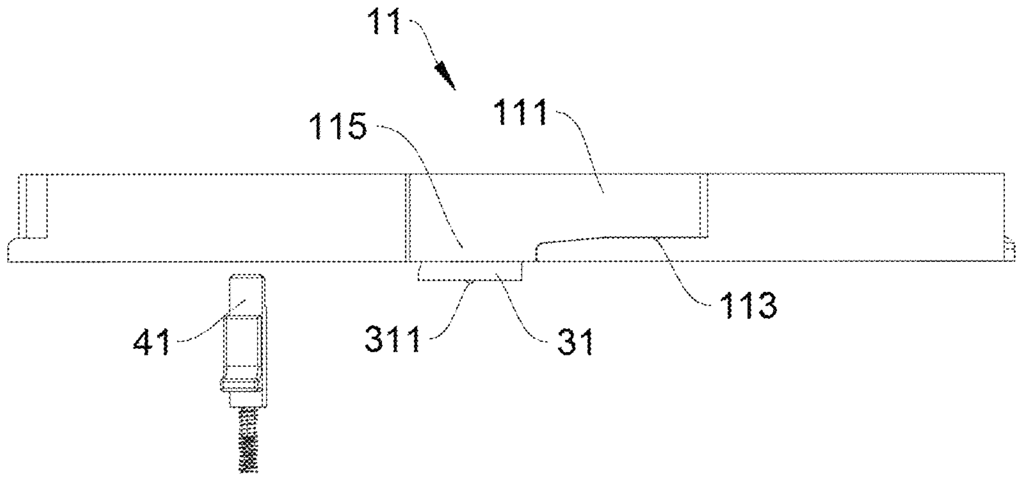
FIG. 11A is a schematic diagram illustrating a first assembly step of the combined fan and light fixture with the quick-release structure of the present disclosure.
Figure 11B:
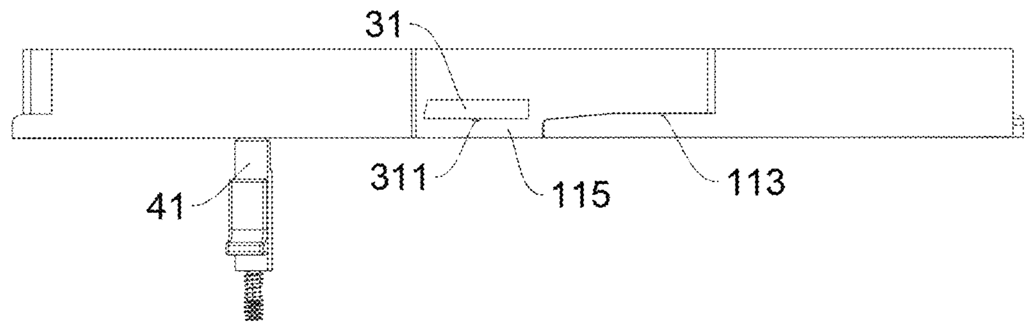
FIG. 11B is a schematic diagram illustrating a second assembly step of the combined fan and light fixture with the quick-release structure of the present disclosure.
Figure 11C:
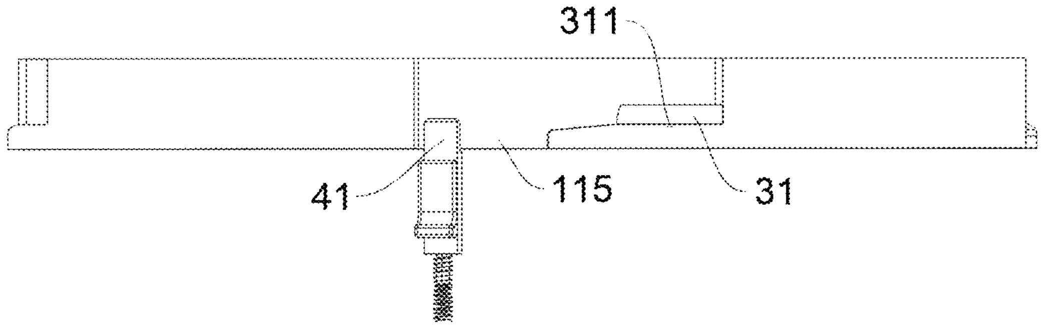
FIG. 11C is a schematic diagram illustrating a third assembly step of the combined fan and light fixture with the quick-release structure of the present disclosure.

As shown in FIGS. 11A-11C, the mounting base 10 is first fixed to a ceiling or another fixed structure. When the fan and light assembly is assembled with the mounting base 10, as illustrated in FIGS. 11A and 11B, an operator aligns each of the latch protrusions 31 (shown in FIG. 6) on the annular connecting cover 30 with a corresponding recess opening 115 (shown in FIGS. 4 and 5) on the mounting base 10 and pushes the annular connecting cover 30 upward, so as to allow each of the latch protrusions 31 to enter a corresponding one of the retaining recesses 11 via the corresponding recess opening 115. The fan and light assembly is then rotated, specifically driving each of the latch protrusions 31 to slide along a corresponding locking groove 111 away from the recess opening 115. As shown in FIG. 11C, a corresponding one of the latch protrusions 31 slides into a corresponding locking groove 111. During rotation of the fan and light assembly, the latch switch 41 is pressed downward by a bottom portion of the mounting base 10 to compress the elastic member 42. Once the rotation of the fan and light assembly is completed, the latch switch 41 is moved to align with a bottom portion of one recess opening 115 and is driven the elastic member 42 to vertically move to embed into the one recess opening 115 to lock the fan and light assembly against rotational movement relative to the mounting base 10. For disassembly, the latch switch 41 is pressed downward to overcome a restoring force of the elastic member 42, disengaging the latch switch 41 from an end portion of the one recess opening 115. The fan and light assembly is then rotated in a reverse direction, allowing each of the latch protrusions 31 to exit through the corresponding recess opening 115, so as to completing the disassembly.

Figure 5:
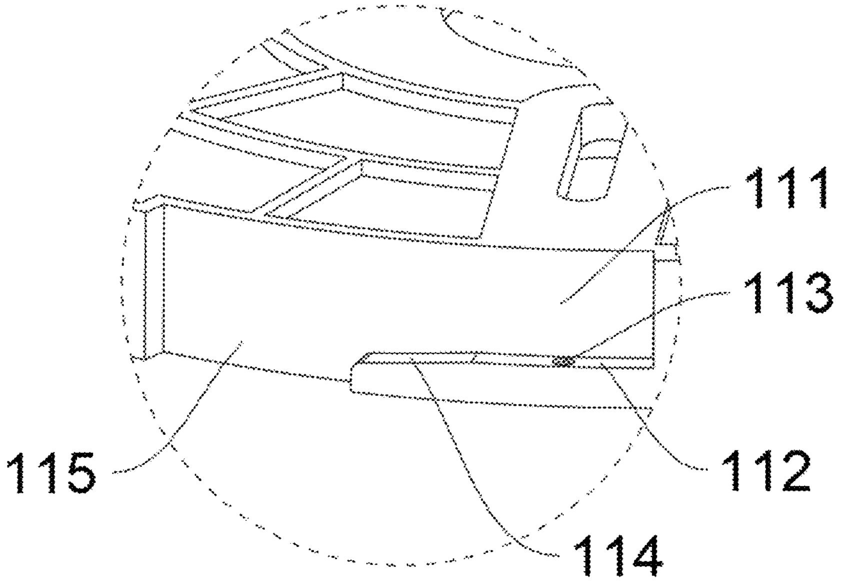
FIG. 5 is a partial enlarged schematic diagram of portion A shown in FIG. 4.
Figure 6:
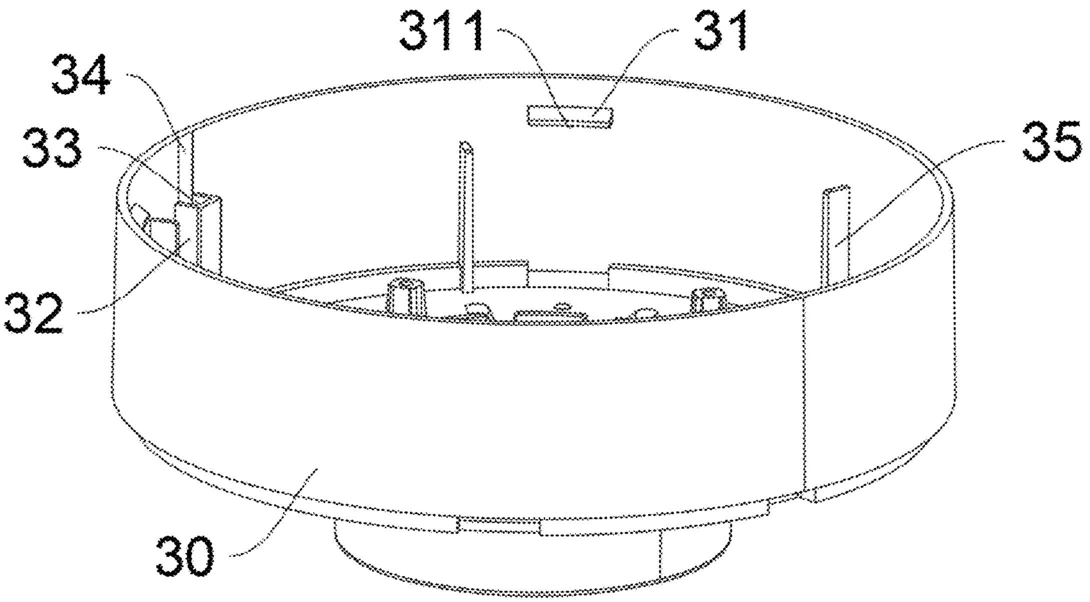
FIG. 6 is a structural schematic diagram of an annular connecting cover shown in FIG. 3.
Figure 7:
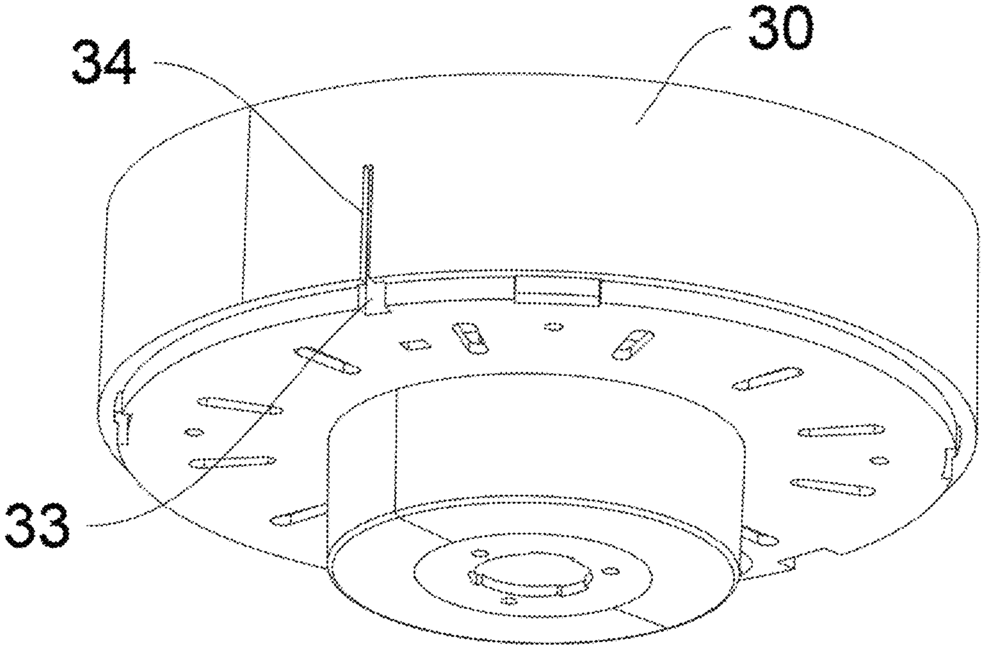
FIG. 7 is another structural schematic diagram of the annular connecting cover shown in FIG. 3.
Figure 8:
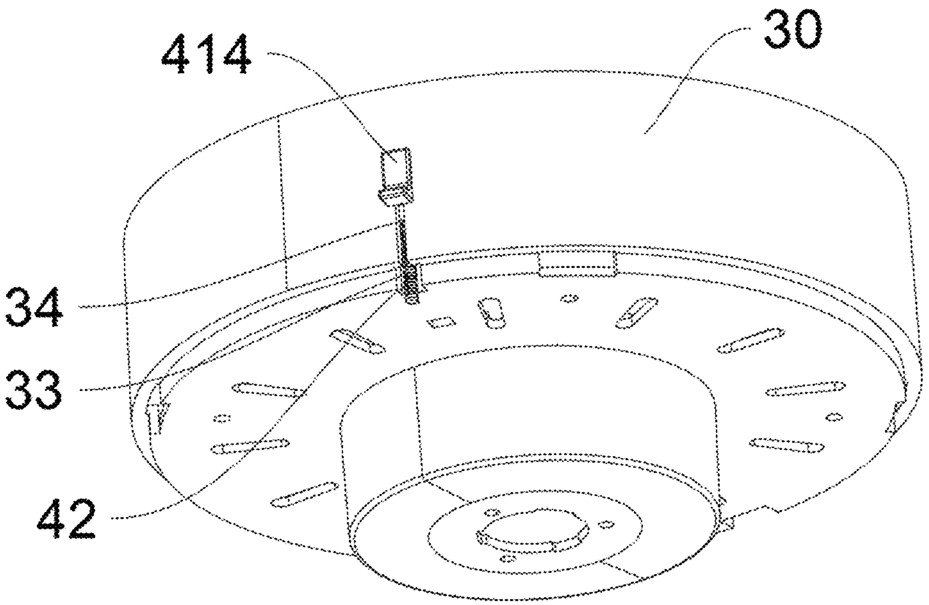
FIG. 8 is a structural schematic diagram of assembly between the annular connecting cover and a latch mechanism shown in FIG. 7.
Figure 9:
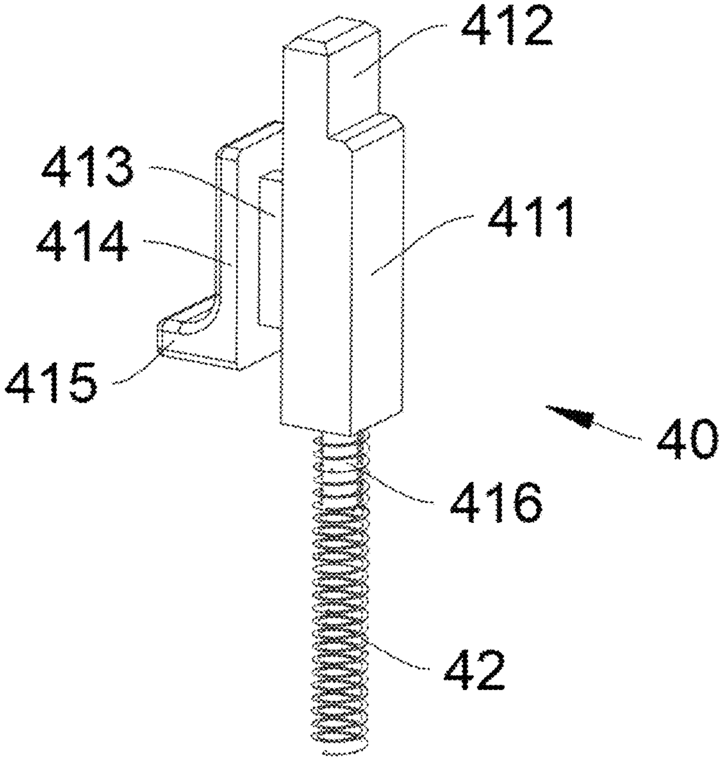
FIG. 9 is a structural schematic diagram of the latch mechanism shown in FIG. 3.
Figure 10:
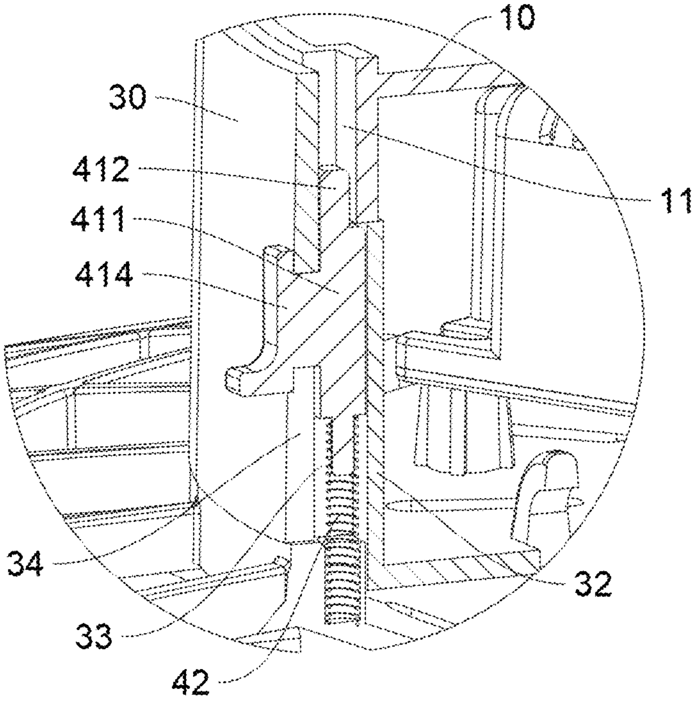
FIG. 10 is a partial structural schematic diagram of assembly between the mounting base, the annular connecting cover, and the latch mechanism of the present disclosure.

Specifically, the mounting base 10 is generally disc-shaped and is fixed to the ceiling via elongated mounting holes 12 and bolts, with the elongated mounting holes 12 being distributed in a circumferential array. A design of the elongated mounting holes 12 facilitate fine positional adjustment during installation, while a disc-shaped configuration of the mounting base 10 satisfies requirements for rotational installation and disassembly with the fan and light assembly. Furthermore, as shown in FIG. 5, a bottom surface of each locking groove 111 includes an abutting surface 112 and a guiding surface 114, each abutting surface 112 is horizontally disposed, and each guiding surface 114 is inclined. Each guiding surface 114 is connected between a corresponding recess opening 115 and a corresponding abutting surface 112, and each guiding surface 114 is configured to smoothly guide a corresponding one of the latch protrusions 31 to slide from the corresponding recess opening 115 to the corresponding abutting surface 112. A concave portion 113 is disposed on each abutting surface 112 for structural positioning. In the embodiment, each concave portion 113 is configured as a hemispherical structure.

Specifically, the fan and light main body 20 includes an outer housing 21, a fan assembly 22, and a lighting assembly 23, the fan assembly 22 is disposed in the outer housing 21, and the lighting assembly 23 is disposed on the outer housing 21. The fan assembly 22 primarily includes a motor and fan blades. The lighting assembly 23 is an LED light strip or an LED light ring, providing illumination functionality. The annular connecting cover 30 is fixed to a top portion of the outer housing 21.

The annular connecting cover 30 serves as a critical connecting component, the latch protrusions 31 protrude from the inner side wall, being annular, of the annular connecting cover 30, and the latch protrusions 31 are configured to respectively match with the retaining recesses 11. The annular connecting cover 30 includes a guiding member 32 protruding from the inner side wall thereof, a guide rail 33 is disposed on the guiding member 32, and the guide rail 33 extends along a vertical direction. The annular connecting cover 30 defines a sliding slot 34 on the inner side wall thereof, the sliding slot 34 radially penetrates through the inner side wall of the annular connecting cover 30, and the sliding slot 34 is communicated with the guide rail 33. Specifically, the sliding slot 34 is defined circumferentially adjacent to one of the latch protrusions 31, a bottom end of the sliding slot 34 is communicated with a bottom portion of the annular connecting cover 30, allowing the latch switch 41 to slide into the sliding slot 34 from the bottom end thereof, and a top end of the sliding slot 34 is disposed at a middle portion of the annular connecting cover 30, thereby limiting a vertical sliding stroke of the latch switch 41. To enhance overall structural strength, reinforcing ribs 35 are disposed on the inner side wall of the annular connecting cover 30 in a circumferential array. Furthermore, a protruding portion 311 is disposed on a bottom portion of each of the latch protrusions 31 to match with a corresponding concave portion 113. In the embodiment, each protruding portion 311 is a smoothed bump. When each of the latch protrusions 31 slides into abutment with a corresponding abutting surface 112, a corresponding protruding portion 311 is engaged in the corresponding concave portion 113, thereby achieving positive positioning of the fan and light assembly relative to the mounting base 10 and preventing loosening.

The latch switch 41 specifically includes a sliding main body 411, a limiting portion 412, an extending portion 413, a press button 414, and a connecting post 416. The limiting portion 412 is fixed to a top portion of the sliding main body 411, the extending portion 413 is disposed on a side portion of the sliding main body 411, the press button 414 is fixed to one end of the extending portion 413, and the connecting post 416 is fixed to a bottom portion of the sliding main body 411. A top portion of the elastic member 42 is sleeved on an outer side of the connecting post 416, and a press protrusion 415 horizontally extends from an outer side surface of the press button 414.

The sliding main body 411 of the latch switch 41 is slidably disposed in the guide rail 33 of the annular connecting cover 30, the extending portion 413 of the latch switch 41 vertically passes through the sliding slot 34 defined on the inner side wall of the annular connecting cover 30. Such configuration positions the press button 414 externally on the annular connecting cover 30, facilitating easy operation. The guide rail 33 provides precise guidance for vertical movement of the sliding main body 411, ensuring stable and linear motion while preventing jamming. Such modular design, which arranges moving parts internally within the annular connecting cover 30, is compact, rational, and facilitates straightforward assembly. Pressing the press button 414 externally on the annular connecting cover 30 drives the sliding main body 411, via the extending portion 413, to move downward against the restoring force of the elastic member 42, thereby achieving unlocking.

Compared with the prior art, according to the combined fan and light fixture with the quick-release structure of the present disclosure, the retaining recesses 11 each with an L-shaped configuration are defined on the mounting base 10, and the latch protrusions 31 and the latch mechanism 40 matched with the retaining recesses 11 are disposed at the annular connecting cover 30 of the fan and light assembly. During installation, one only needs to align each of the latch protrusions 31 with the corresponding recess opening 115, then lift and rotate each of the latch protrusions 31. Thereafter, the restoring force of the elastic member 42 in the latch mechanism 40 automatically drives the latch switch 41 to move upward and abut against an end portion of the one recess opening 115 aligned therewith, thereby achieving rapid locking. This process is tool-free, simple, safe, and significantly improves efficiency of both installation and disassembly. Meanwhile, the latch mechanism 40 effectively restricts relative rotation between the fan and light assembly and the mounting base 10, ensuring connection reliability.

Furthermore, a bottom surface of each locking groove 111 includes an abutting surface 112 and a guiding surface 114, while a concave portion 113 is disposed on each abutting surface 112, a protruding portion 311 is disposed on a bottom portion of each of the latch protrusions 31 to match with a corresponding concave portion 113. Such configuration offers smooth guidance during rotational engagement and achieves precise positional location upon completion, effectively preventing accidental loosening.

The above description only represents preferred technical solutions of the present disclosure, and the description thereof is relatively specific and detailed, but cannot be understood as a limitation on the protection scope of the present disclosure. It should be noted that, for those who skilled in the art, several modifications and improvements may be made without departing from a concept of the present disclosure, and the present disclosure is also intended to include these modifications and variations.

What is claimed is:

1. A combined fan and light fixture with a quick-release structure, comprising:

a mounting base;

a fan and light assembly; and a latch mechanism;

wherein retaining recesses are circumferentially spaced apart from each other on a bottom side wall of the mounting base, each of the retaining recesses defines a locking groove and a recess opening, each locking groove extends along a circumferential direction of the mounting base, and each recess opening is configured to communicate a corresponding locking groove with a bottom edge of the mounting base;

the fan and light assembly comprises a fan and light main body and an annular connecting cover, the annular connecting cover is fixed to a top portion of the fan and light main body, latch protrusions protrude from an inner side wall of the annular connecting cover, and the latch protrusions are configured to respectively match with the retaining recesses;

the latch mechanism is disposed at the annular connecting cover, the latch mechanism comprises a latch switch and an elastic member, the latch switch is slidably disposed at the annular connecting cover, the elastic member is disposed below the latch switch, a first end of the elastic member abuts against the latch switch, and a second end of the elastic member abuts against the fan and light assembly;

when the fan and light assembly is assembled with the mounting base, the annular connecting cover is preliminarily sleeved on the mounting base, the latch switch is pressed downward by a bottom portion of the mounting base to slide along the annular connecting cover to further compress the elastic member;

when the annular connecting cover rotates relative to the mounting base, each of the latch protrusions is moved to a position aligned with a corresponding recess opening and is vertically moved upward to enter a corresponding locking groove; and when the annular connecting cover continues to rotate relative to the mounting base, each of the latch protrusions is driven to slide along the corresponding locking groove away from the corresponding recess opening, the latch switch is moved to align with a bottom portion of one recess opening and is pushed by a restoring force of the elastic member to embed into the one recess opening to lock the fan and light assembly against rotational movement relative to the mounting base.

2. The combined fan and light fixture with the quick-release structure according to claim 1, wherein the latch switch comprises a sliding main body, a limiting portion, an extending portion, a press button, and a connecting post;

the limiting portion is fixed to a top portion of the sliding main body, the extending portion is disposed on a side portion of the sliding main body, the press button is fixed to one end of the extending portion, and the connecting post is fixed to a bottom portion of the sliding main body; and the press button is configured to drive the sliding main body to move downward and compress the elastic member after being pressed.

3. The combined fan and light fixture with the quick-release structure according to claim 2, wherein a press protrusion horizontally extends from an outer side surface of the press button.

4. The combined fan and light fixture with the quick-release structure according to claim 2, wherein the annular connecting cover comprises a guiding member protruding from the inner side wall thereof, a guide rail is disposed on the guiding member, the guide rail extends along a vertical direction, and the sliding main body is slidably disposed in the guide rail.

5. The combined fan and light fixture with the quick-release structure according to claim 4, wherein the annular connecting cover defines a sliding slot on the inner side wall thereof, the sliding slot radially penetrates through the inner side wall of the annular connecting cover, and the sliding slot is communicated with the guide rail; and the extending portion of the latch switch passes through the sliding slot and is vertically slidable within the sliding slot, and the press button is disposed on an outer portion of the annular connecting cover.

6. The combined fan and light fixture with the quick-release structure according to claim 1, wherein a bottom surface of each locking groove comprises an abutting surface and a guiding surface, each abutting surface is horizontally disposed, and each guiding surface is inclined; and each guiding surface is connected between a corresponding recess opening and a corresponding abutting surface, and each guiding surface is configured to guide a corresponding one of the latch protrusions to slide from the corresponding recess opening to the corresponding abutting surface.

7. The combined fan and light fixture with the quick-release structure according to claim 6, wherein a concave portion is disposed on each abutting surface, a protruding portion is disposed on a bottom portion of each of the latch protrusions to match with a corresponding concave portion; and when each of the latch protrusions slides into abutment with a corresponding abutting surface, a corresponding protruding portion is engaged in the corresponding concave portion.

8. The combined fan and light fixture with the quick-release structure according to claim 7, wherein each concave portion and each protruding portion are configured as hemispherical structures.

9. The combined fan and light fixture with the quick-release structure according to claim 1, wherein reinforcing ribs are disposed on the inner side wall of the annular connecting cover in a circumferential array.

10. A combined fan and light fixture with a quick-release structure, comprising:

a mounting base;

a fan and light assembly; and a latch mechanism;

wherein at least two retaining recesses are circumferentially spaced apart from each other on a bottom side wall of the mounting base, each of the at least two retaining recesses defines a locking groove and a recess opening, each locking groove extends along a circumferential direction of the mounting base, and each recess opening is configured to communicate a corresponding locking groove with a bottom edge of the mounting base;

the fan and light assembly comprises a fan and light main body and an annular connecting cover, the annular connecting cover is fixed to a top portion of the fan and light main body, at least two latch protrusions protrude from an inner side wall of the annular connecting cover, and the at least two latch protrusions are configured to respectively match with the at least two retaining recesses;

the annular connecting cover defines a sliding slot extending in a vertical direction, the sliding slot is defined circumferentially adjacent to one of the at least two latch protrusions, a bottom end of the sliding slot is communicated with a bottom portion of the annular connecting cover, and a top end of the sliding slot is disposed at a middle portion of the annular connecting cover;

the latch mechanism is disposed at the annular connecting cover, the latch mechanism comprises an elastic member and a latch switch, the latch switch is slidably disposed at the sliding slot of the annular connecting cover, a first end of the elastic member abuts against the latch switch, and a second end of the elastic member abuts against the fan and light assembly;

when the fan and light assembly is assembled with the mounting base, the annular connecting cover is preliminarily sleeved on the mounting base, the latch switch is pressed downward by a bottom portion of the mounting base to slide along the sliding slot of the annular connecting cover to further compress the elastic member;

when the annular connecting cover rotates relative to the mounting base, each of the latch protrusions is moved to a position aligned with a corresponding recess opening and is vertically moved upward to enter a corresponding locking groove; and when the annular connecting cover continues to rotate relative to the mounting base, each of the latch protrusions is driven to slide along the corresponding locking groove away from the corresponding recess opening, the latch switch is moved to align with a bottom portion of one recess opening and is pushed by a restoring force of the elastic member to embed into the one recess opening to lock the fan and light assembly against rotational movement relative to the mounting base.

* * * * *